(12) United States Patent
Pravetz et al.

(10) Patent No.: US 7,406,599 B1
(45) Date of Patent: Jul. 29, 2008

(54) INDICATING STATUS FOR DIGITAL SIGNATURES

(75) Inventors: James D. Pravetz, Sunnyvale, CA (US); William Ie, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 707 days.

(21) Appl. No.: 10/819,703

(22) Filed: Apr. 6, 2004

(51) Int. Cl.
*H04L 9/00* (2006.01)
*H04K 1/00* (2006.01)
*H04N 7/167* (2006.01)
*G06K 9/00* (2006.01)

(52) U.S. Cl. .................. 713/176; 713/186; 382/119; 382/120; 382/121; 382/122; 382/123; 380/232

(58) Field of Classification Search .............. 713/176, 713/186; 382/119, 121, 122, 123, 232, 115; 380/23, 232
See application file for complete search history.

(56) References Cited

U.S. PATENT DOCUMENTS

| | | | | |
|---|---|---|---|---|
| 5,818,955 | A * | 10/1998 | Smithies et al. | 382/115 |
| 7,197,167 | B2 * | 3/2007 | Chung et al. | 382/123 |
| 2002/0174338 | A1 * | 11/2002 | Tomita et al. | 713/176 |
| 2003/0179913 | A1 * | 9/2003 | Murase et al. | 382/119 |
| 2005/0102520 | A1 * | 5/2005 | Baxter et al. | 713/176 |
| 2005/0132196 | A1 * | 6/2005 | Dietl | 713/176 |

OTHER PUBLICATIONS

McKenzie, Bruce, "Digital Signatures and Apple Mail," bioneural. blog> Mac>, Apr. 25, 2004, http://homepage.mac.com/bruce.mckenzie/iblog/C1703310809/E1216087563/.

Wingfors, Joar, "Using Encryption and Digital Signatures in Mail," May 31, 2004, http://www.joar.com/certificates/.

* cited by examiner

*Primary Examiner*—Christopher Revak
*Assistant Examiner*—Shin-Hon Chen
(74) *Attorney, Agent, or Firm*—Fish & Richardson P.C.

(57) ABSTRACT

Methods and apparatus, including computer program products, for presenting status of digital signatures. A digital document is received that defines a presentation structure and includes a digital signature. The digital document specifies a representation of the digital signature and a location in the presentation structure for the representation of the digital signature. A status is determined for the digital signature. A status representation is associated with the digital signature, where the status representation identifies the status determined for the digital signature. Without altering the representation of the digital signature, at least a portion of the digital document and the status representation of the digital signature are presented in a user interface, where the status representation is presented in the presentation structure at a location that depends upon the location of the digital signature.

51 Claims, 5 Drawing Sheets

INDICATING STATUS FOR DIGITAL SIGNATURES

BACKGROUND

The present invention relates to processing digital documents.

A digital document is a collection of digital data that includes digital content for which a presentation structure is defined. The presentation structure is a structure that is used to arrange different portions of the digital content when the document is presented in a user interface. For the content portions, the presentation structure can specify a layout, a sequential, parallel or other ordering, a visual appearance or an audio presentation. The digital content can represent text, graphics, animation, video, audio or any other data carrying information. The content of the document can be digitally signed by adding a digital signature to the document. The digital signature is based on cryptographic techniques and is used to authenticate the signer and the content that has been signed. The authentication verifies the identity of the signer and whether the content is changed since the document has been signed. Optionally, the authentication can also verify whether the signer's digital identity certification has been revoked. Thus the digital signature can have different statuses depending on the state of failure or success to authenticate the signer or the content.

Digital signatures are typically used to sign entire messages that are electronically transmitted, for example, by electronic mail ("e-mail"). If an e-mail message is digitally signed, the recipient can identify the sender and verify if the message was corrupted during the transmission. In a user interface, document management applications typically display the status of a digital signature separate from the content of the document. For example, some e-mail applications indicate the status of the signature in a header that is defined to provide information about the e-mail message. The user interface can also display a control panel that includes menu items or control icons that can be selected by a user for information about the digital signature. In the control panel, the menu items or the icons may include text or symbols that indicate whether a document is digitally signed, and if signed, what is a current status for the digital signature.

Adobe® Acrobat® applications, available from Adobe Systems Incorporated of San Jose, Calif., allow users to embed a graphical representation of the digital signature into the layout defined by a document in Portable Document Format ("PDF"). The signature's representation can include an image illustrating a hand-written signature of the signer or any other image or symbol. Thus similar to traditional paper documents, the signer's signature becomes part of the visual representation of the document, and the location of the signature visually associates the signature with the signed content. To indicate a status of the digital signature, the signature's graphical representation has been changed in the PDF document by the Acrobats application. For example, a green check mark has been added to the signature's representation to indicate that the signature is valid.

SUMMARY

Without altering a representation that defines a presentation for a digital signature in a digital document, the signature's status is indicated by a status representation that is presented by a document management application in association with the signature's representation. In one implementation, the signature's representation includes a graphical representation, and the status representation is presented in visual association with the graphical representation of the signature. In alternative implementations, the signature's representation or the status representation can specify animated, video or audio presentations, and the status representation can be associated with the signature in the structure of the document presentation. For example, the status representation can be presented during, closely preceding or following the presentation of the signature's representation.

In general, in one aspect, the invention provides methods and apparatus, including computer program products, for presenting status of digital signatures. A digital document is received that defines a presentation structure and includes a digital signature. The digital document specifies a representation of the digital signature and a location in the presentation structure for the representation of the digital signature. A status is determined for the digital signature. A status representation is associated with the digital signature, where the status representation identifies the status determined for the digital signature. Without altering the representation of the digital signature, at least a portion of the digital document and the status representation of the digital signature are presented in a user interface, where the status representation is presented in the presentation structure at a location that depends upon the location of the digital signature.

Particular implementations can include one or more of the following features. Determining a status for the digital signature can include selecting a status from multiple predefined statuses. Each predefined status can be represented by a corresponding icon. The status representation of the digital signature can include the icon representing the selected status. One or more of the predefined statuses can indicate that the digital signature is a valid signature or an invalid signature. Determining a status for the digital signature can include determining whether the received document is changed since it has been signed, and selecting a status that indicates an invalid signature if the received document is changed since it has been signed. One or more of the predefined statuses can indicate that the signer of the digital signature is identified or unknown. One or more of the predefined statuses can indicate that the validity of the digital signature has not been determined. One or more of the predefined statuses indicate a confidence level for the validity of the digital signature. Presenting the status representation of the digital signature can include presenting the status representation in response to user input. The representation of the digital signature can include a graphical representation of the digital signature. The graphical representation of the digital signature can be specified in a signature region defined in the presentation structure. The status representation can define a graphical status representation, and presenting the status representation of the digital signature can include presenting the graphical status representation at a location within the signature region. A user input selecting the digital signature can be received in the user interface, and in response to the received user input, information can be presented in the user interface about the status determined for the digital signature. The user input can be received from a pointing device. Receiving a user input selecting the digital signature can include receiving a user input selecting the status representation presented in the user interface. The status for the digital signature can be updated, and based upon the updated status, the status representation of the digital signature can be updated. The digital document can include a second digital signature. The document specifies a representation for the second digital signature and a location in the presentation structure for the representation of the second digital signature. A status can be determined for the second digital signature, and a second status representation can be associated with the second digital signature, where the second status representation identifies the status determined for the second digital signature. Without altering the representation of the second digital signature, the second status representation can be presented in the presentation structure at a location that depends upon the location of the second signature. The presentation structure can define a layout of the document, and the location of the representation of the digital signature can be defined in the layout of the document.

The invention can be implemented to realize one or more of the following advantages. A status representation can be presented for a digital signature without altering any portion of the document, including the signature's representation. Thus the document can remain the same, independent of whether a particular document management application can authenticate the signature or not. Therefore, misleading status representations can be avoided in the document. The document's integrity can be better protected and the authentication can become more reliable, because the status is indicated for a signature completely independent of any explicit status information in the document.

In a user interface, the status can be indicated to a user in association with the signature's representation in the document. For example, the document management application can present a status representation above or near the signature's graphical representation in the image. With a pointing device, a user can select the status representation or the signature's representation to obtain information about the digital signature. Thus both the signature's representation and the signature's status can be presented in the same visual context as defined by the layout of the document. For a document that includes multiple signatures, the status can be indicated for each signature separately such that a user can conveniently associate the signatures with their respective statuses. The status representation can also be associated with the signature in audio, animated or video presentations. For example, the status representation can be presented at a specific or relevant location in a linear playback. The status representation can also be presented along with contextual information that defines a context or coverage for the corresponding signature.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
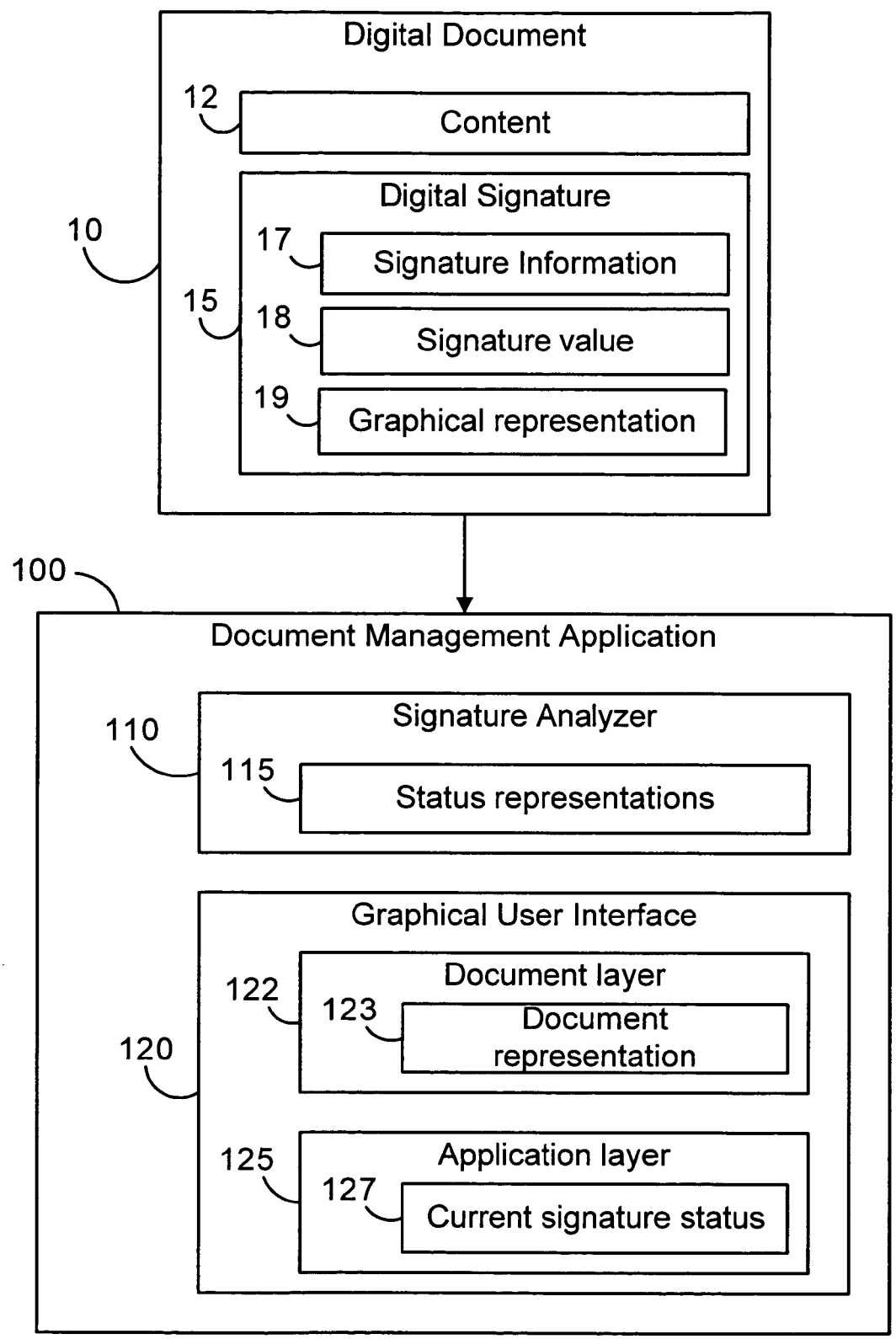
FIG. 1 is a schematic diagram illustrating a document management application for indicating status of digital signatures in digital documents.

FIG. 1 illustrates a document management application 100 receiving a digital document 10. The digital document 10 includes digital data for which a visual representation is defined. The defined visual representation has a presentation structure, such as a layout or a presentation sequence for different data portions. At least a portion of the data is digitally signed in the document 10. For the digital signature, the document 10 specifies a graphical representation, which can be part of the signed data portion. The document management application 100 presents the document 10 or portions of it to a user. Without altering the document 10, the application 100 indicates a signature status in visual association with the signature's representation in the document.

In alternative implementations, the digital signature or its status can be represented by animated, video or audio presentations, and the status representation can be associated with the signature in a presentation structure of the document. In general, a location is defined as a position in the presentation structure of the document. For example, the location can be defined as a two-dimensional position in a two-dimensional layout or as a sequence position in a presentation sequence. Thus to associate the status with the digital signature, the status representation's location can be defined close to the location of the digital signature's representation in the presentation structure. In animated, video or audio presentations, the status representation can be presented during, closely preceding or following the signature's representation.

The digital document 10 can be implemented in a single file or in multiple files that are linked together by explicit references inside the files. In one implementation, the digital document 10 is a PDF document including multiple digital objects, such as document pages, images or any other digital object. Alternatively, the digital document can be a document in any other format, such as Extensible Markup Language ("XML") or Hyper Text Markup Language ("HTML") format.

The digital document 10 includes content 12 and a digital signature 15 to identify the signer of the content 12. The content 12 can represent text, graphics, animation, audio, video, or any other digital data. The digital signature 15 includes signature information 17, a signature value 18, and a graphical representation 19. The signature information 17 includes information about the digital signature 15, the signature value 18 is an encrypted digest of the data that has been signed with the digital signature 15, and the graphical representation 19 specifies a visual representation for the digital signature 15.

The signature information 17 specifies information related to the identity of the signer, and identifies the data portion that has been signed. In one implementation, the signed data includes the content 12, the signature information 17 itself, and the graphical representation 19. Alternatively, the signed data can include only the content 12 and the graphical representation 19. By including the graphical representation 19 in the signed data, changes can be detected in the graphical representation 19 of the digital signature. The signature information 17 can also include information about a cryptographic technique or a public key that can be used to verify the signature value 18. For example, the signature information 17 can include the signer's public key certificate that specifies the cryptographic signature technique and the public key for the signature value 18.

The signature value 18 can be used to verify the signature 15. The signature value 18 specifies a digest that is generated from the signed data and encrypted with the private key of the signer. The digest is defined by a mathematical function, often called hash, whose value depends on the signed data such that any change in the signed data alters the function value. Thus any change can be detected in the signed data by applying the mathematical function to the signed data and comparing the function value with the digest defined by the signature value 18.

The graphical representation 19 specifies a visual appearance for the digital signature 15. The graphical representation 19 can specify text, symbols or images. For example, the graphical representation 19 can include a digital image of the hand-written signature of the signer. Or the graphical representation 19 can specify a logo, a name or a photograph. In alternative implementations, the digital signature's representation can specify audio, animated or video presentations.

The graphical representation 19 has a location defined in the presentation structure of the document 10. In one implementation, the document 10 defines a signature region for presenting the graphical representation 19. If the document defines a fixed layout such as a layout of a document page, the signature region can be defined at a particular location on the document page. If the document 10 can be rendered in different layouts in different interfaces, the signature's location can be defined relative to the location of the content 12. Thus the graphical representation 19 of the signature can appear in the proximity of the content 12, even if the content 12 is rendered at different locations in different layouts. Alternatively, the signature's location can be defined in an animated, video or audio presentation structure of the document.

The graphical representation 19 can have a fixed size or a variable size. For a fixed-size representation 19, the represented signature can be easily recognized visually even if the rest of the document is illegibly small. For a variable-size representation, the represented signature can appear as an integral part of the document.

In alternative implementations, the document 10 can include more than one separately signed content portion, and a respective digital signature for each signed portion. One or more of the signatures can be an "invisible signature" for which no graphical representation has been specified. Optionally, an invisible signature can be associated with a signature region that identifies a particular portion of a document layout. For example, the particular portion can represent the content 12 or the signer. In such implementations, the identified portion of the document layout can be used as the graphical representation 19 of the digital signature 15.

The document management application 100 includes a signature analyzer 110 to analyze the digital signature 15 and a graphical user interface 120 to present the digital document 10 or portions of it to a user. The signature analyzer 110 is configured to analyze digital signatures and related data in the received document and to determine a signature status based on the analysis. Thus the signature analyzer 110 can determine a status for the digital signature 15 in the document 10. The determined status is presented in the graphical user interface 120 in visual association with the graphical representation 19 of the signature 15.

The signature analyzer 110 can specify a plurality of different statuses. For example, different statuses can indicate an "Identified Signer" or an "Unknown Signer." The signature analyzer 110 can use the signature value 18 in the digital signature 15 to authenticate the signed data in the document 10, and specify a "Valid" or "Not valid" status to indicate whether the authentication has been successful or failed. A "Don't know" status can indicate that the signature analyzer 110 has not analyzed the digital signature 15 or an analysis has been performed but did not provide a definite classification for signer or content authentication. Depending on a state of success or failure of the signer or content authentication, the signature analyzer 110 can specify other statuses for the digital signature 15. For example, different statuses can be defined for different levels of confidence in the result of the authentication.

The signature analyzer 110 defines status representations 115 for the different statuses. Each status representation 115 identifies a corresponding status that is specified by the signature analyzer 110. Each status representation 115 is a human perceivable representation that can include text, icons, images, audio, animation or video presentations to identify the corresponding status of the signature 15. For example, an icon can include a question mark to represent that the signer of the signature is not identified. Another icon can include a check mark to represent a valid signature, and yet another icon can include an "X" to indicate that the signature is invalid. The status representations 115 can be defined by icons that have similar "style" than other icons defined by the application 100. Such icons may be recognized as being defined by the application 100, and not being part of the document 10.

The graphical user interface 120 presents the digital document 10 or portions of it to a user. The graphical user interface 120 specifies a document layer 122 and an application layer 125. The document layer 122 is dedicated to present the content of the document 10, and the application layer 125 is dedicated to present information generated by the application 100. For example, a first pixel array is defined in the document layer 122 based on the document 10, and a second pixel array is defined in the application layer 125 to present menus, dialog boxes, or pointing arrows defined by the application 100. The graphical user interface 120 can composite the first and second pixel arrays into an output pixel array that is presented to a user by a display device. Optionally, the second pixel array can specify a transparency for the composition with the first pixel array.

In the document layer 122, a document representation 123 presents the content 12 and the graphical representation 19 of the signature 15 as specified in the document 10. If the document 10 specifies a particular layout such as a document page, the document representation 123 has the same layout. If the document 10 specifies only a sequence of paragraphs without particular page width or arrangement on the page, the graphical user interface 120 presents the paragraphs in the document representation 123 according to the specified sequence, and defines the page width or arrangement based on other information, such as the shape of a screen or a presentation window.

In the application layer 125, a current signature status 127 is presented to indicate the status determined by the status analyzer 110 for the digital signature 15. The current signature status 127 is represented by one of the status representations 115 defined by the status analyzer 110. The current signature status 127 is presented in the application layer 125 without altering the graphical representation 19 of the digital signature 15 in the document layer 122. In the application layer 125, the user interface 120 can also present other application-defined objects.

The current signature status 127 is presented in visual association with the graphical representation 19 of the signature 15. Thus the current signature status 127 is presented at a location that depends on the location of the graphical representation 19 in the document representation 123. The location of the graphical representation 19 can be determined by the document management application 100 by analyzing the document 10, and in particular the data describing the graphical representation 19. For example, the application 100 can identify the graphical representation 19 and its location in the document representation 123. If the graphical representation 19 is defined in a signature region, the application 100 can determine the location of the signature region.

To establish a visual association, the application can present the current signature status 127 over or near the graphical representation 19 of the signature. For example, the signature status 127 can be presented within the signature region or in proximity of the signature region. Thus a user can immediately and easily recognize the current status of the signature 15. If the signature status 127 overlaps with the graphical representation 19 of the signature, the signature status 127 may be recognized as being defined by the application 100, and not the document 10. In alternative implementations, the digital document 10 can include multiple digital signatures and a separate status representation can be presented for each digital signature. Optionally, the application 100 can present only selected signature statuses such as statuses that correspond to invalid signatures. Alternatively, only valid signature statuses can be presented.

The current signature status 127 can be presented in a fixed or variable size. By presenting the signature status 127 in a fixed size, a user can easily identify the current status of the signature. Furthermore, if the document's is presented in a different size and the size of the signature's status representation remains the same, the user can easily recognize that the current signature status 127 is defined by the application 100 and not by the document 10.

Figure 2:
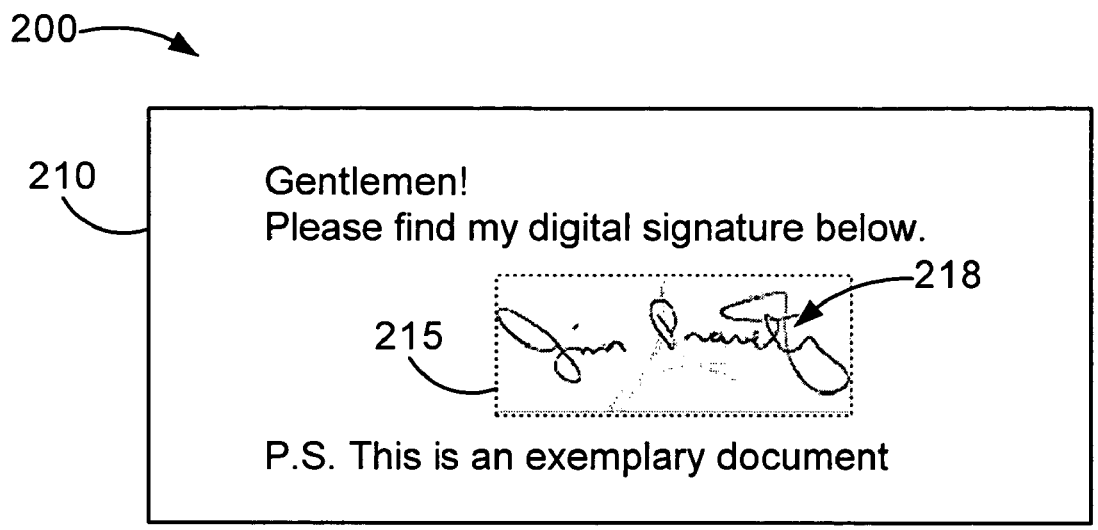
FIGS. 2-3 are schematic diagrams illustrating exemplary graphical user interfaces for document management applications to indicate status of digital signatures.
Figure 2:
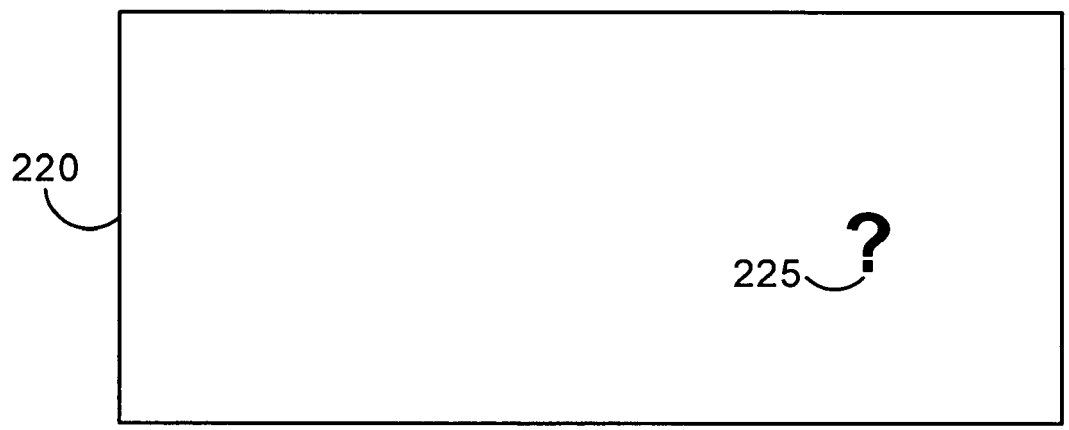
Figure 2:
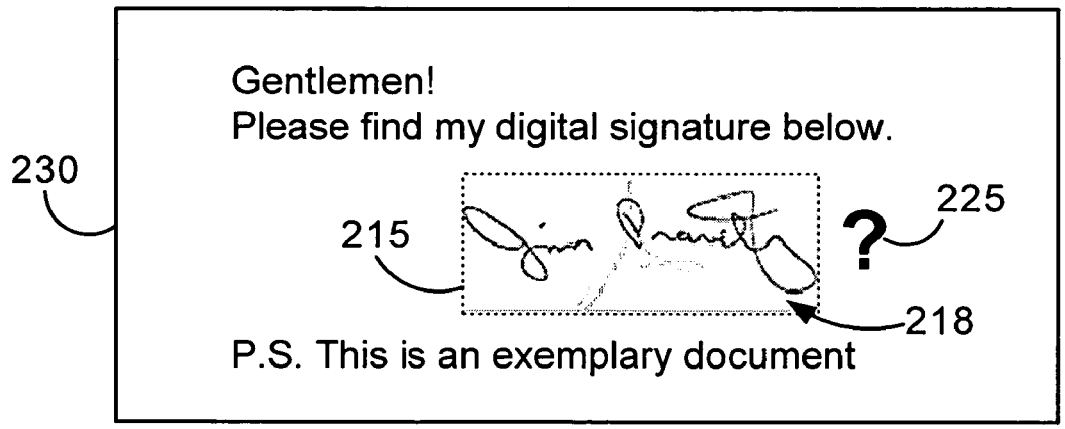

FIG. 2 illustrates an exemplary graphical user interface 200 for the document management application 100 (FIG. 1) or other applications that indicate a status for digital signatures. The graphical user interface 200 includes a document layer 210 dedicated to present data in a received document and an application layer 220 dedicated to present application defined objects. The user interface 200 also specifies an output presentation 230 that is presented to a user by a display device. The output presentation 230 is generated by overlaying the application layer 220 over the document layer 210 by using opaque or transparent compositing techniques.

The document layer 210 presents a document representation of a first exemplary document that has a letter format. The first document includes a digital signature for which a signature region 215 is defined. Within the signature region 215, a graphical representation 218 is presented for the digital signature. The graphical representation 218 is specified by the first document, thus it is included in the document layer 210. In the first exemplary document, the graphical representation 218 includes an image of the signer's signature written over a triangle-like symbol. Within the layout of the first document, the graphical representation 218 has a location that corresponds to a traditional location of a signature in a letter.

The application layer 220 is dedicated to present graphical objects defined and manipulated by the document management application. In the example, the application layer specifies only a current status representation 225 that is a question mark icon indicating that the signature has not been verified. The current status representation 225 has a location selected according to the location of the signature region 215. Thus in the output presentation 230 where the application layer 220 is overlaid over the document layer 210, the current status representation 225 is located next to the graphical representation 218 of the digital signature. Due to their proximity in the output presentation 230, the current status representation 225 is visually associated with the digital signature without altering the first document, and in particular the graphical representation 218 of the signature in the document layer 210.

A visual association can be established between a digital signature and a corresponding signature status by positioning the current status representation 225 relative to the signature in many ways. For example, the current status representation 225 can be positioned such that it is located over the signature region 215 in the output presentation 230. To avoid obscuring the graphical representation 218 of the digital signature, the status representation 225 can be a partially transparent object. Or the status representation may appear only if a user selects the signature region 215 using a pointing device.

Figure 3:
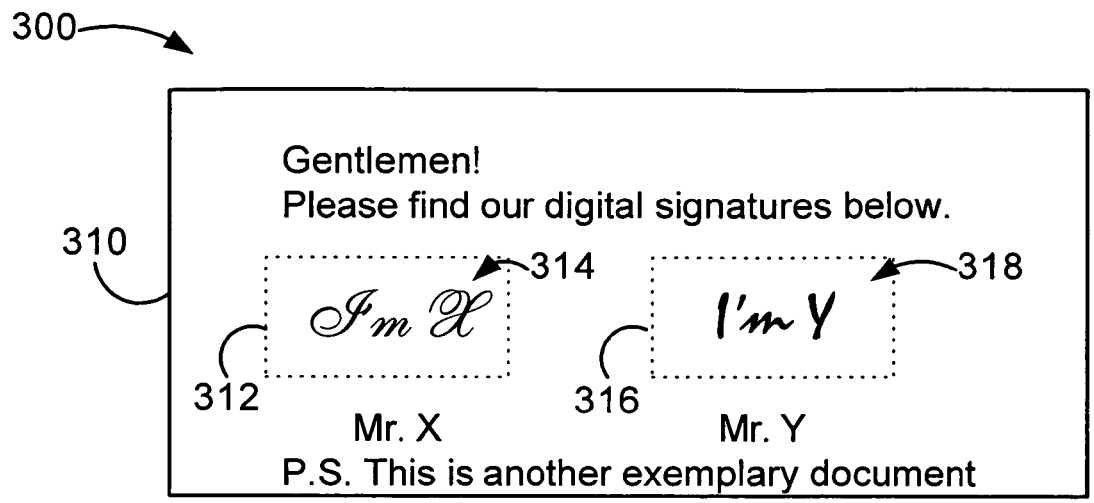
Figure 3:
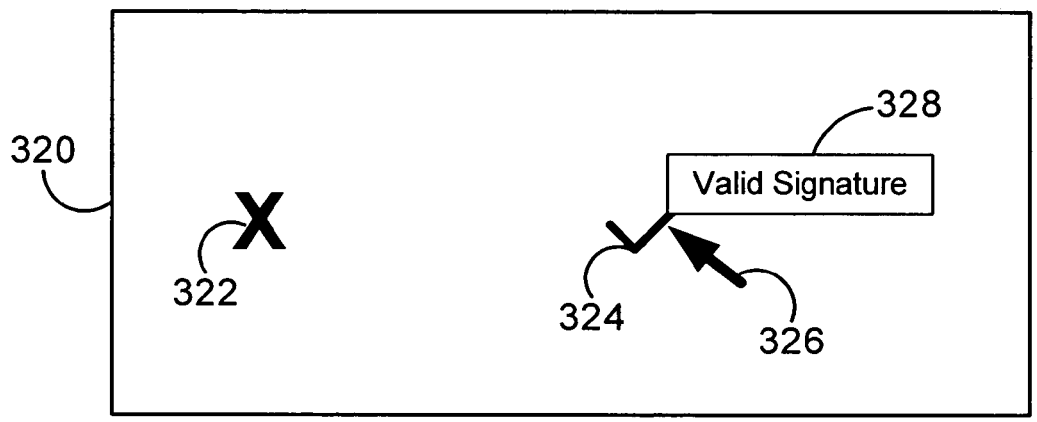
Figure 3:
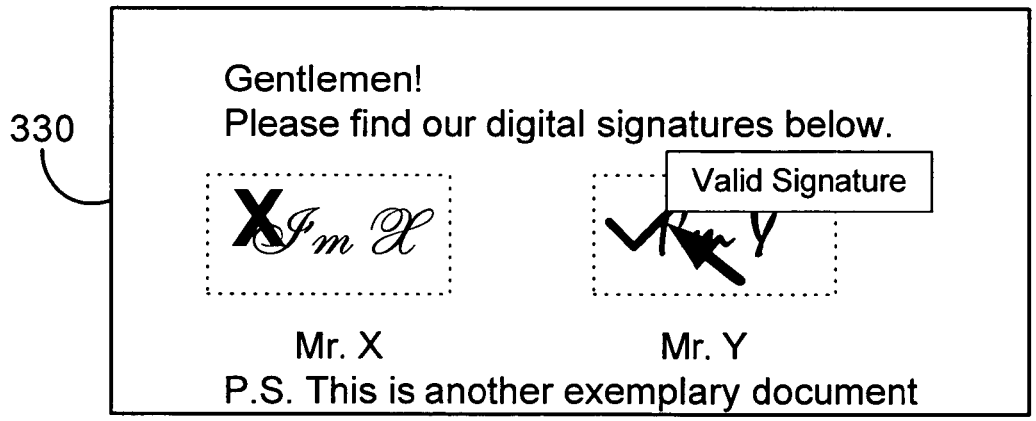

FIG. 3 illustrates another exemplary graphical user interface 300 for the document management application 100 (FIG. 1) to indicate a status for digital signatures. The graphical user interface 300 includes a document layer 310 and an application layer 320, and specifies an output presentation 330 that is presented to a user on a display device. The output presentation 330 is generated by overlaying the application layer 320 over the document layer 310.

The document layer 310 is dedicated to present a document representation of a second exemplary document that also has a letter format. The second document includes a first digital signature and a second digital signature for which a first signature region 312 and a second signature region 316 are defined, respectively. Within the first and second signature regions 312 and 316, a first graphical representation 314 and a second graphical representation 318 are presented for the respective digital signatures. The graphical representations 314 and 318 are specified by the document, thus they are presented in the document layer 310. In the second document, each of the graphical representations 314 and 318 includes a corresponding text introducing the respective signer ("I'm X" and "I'm Y"). Within the layout of the second document, the graphical representations 314 and 318 have respective locations that have specific context with the layout of the document. In particular, the layout identifies the graphical representation 314 as the signature of Mr. X and the graphical representation 318 as the signature of Mr. Y.

The application layer 320 is dedicated to present graphical objects defined and manipulated by the document management application. In the example, the application layer 320 specifies a first status representation 322, a second status representation 324, a pointing arrow 326 and a message 328. The first status representation 322 is an icon illustrating a cross to indicate that the first signature (for Mr. X) is not valid, and the second status representation 324 is an icon illustrating a check mark to indicate that the second signature (for Mr. Y) is valid. The first and second status representations 322 and 324 have locations that are selected based on the locations of the respective signature regions 312 and 316.

Thus in the output presentation 330 where the application layer 320 is overlaid over the document layer 310, the first status representation 322 is located over the graphical representation 314 of the first signature and the second status representation 324 is located over the graphical representation 318 of the second signature. Thus the first and second status representations 322 and 324 are visually associated with the respective digital signatures without altering the second document, and in particular the graphical representations 314 and 318 of the signatures in the document layer 310.

In the application layer 320, the pointing arrow 326 points to the second status representation 324, indicating that a user selected the second status representation 324 with a pointing device. In response to the selection, the document management application displays the message 328 explaining that the second status representation 324 indicates that the second signature is valid. In alternative implementations, the message 328 can be displayed if the user selects the second signature region 316.

Figure 4:
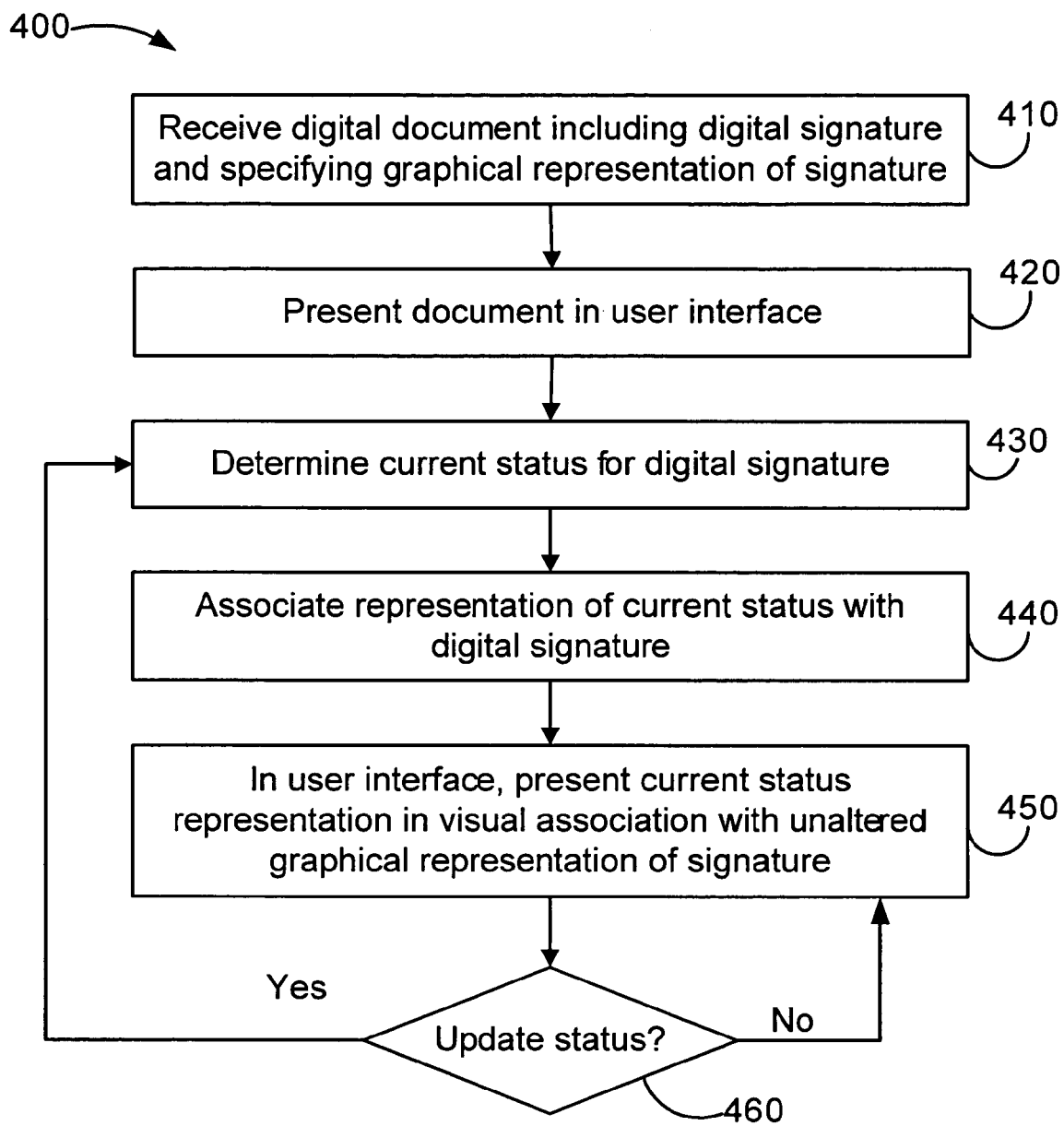
FIGS. 4-6 are schematic flow diagrams for illustrating methods for indicating status of digital signatures in digital documents.

FIG. 4 illustrates a method 400 for indicating a status of a digital signature. The method 400 can be performed by a system that includes the document management application 100 (FIG. 1).

The system receives a digital document including a digital signature (step 410). The digital signature can be used to identify the signer or to authenticate content in the received document. The digital document specifies a graphical representation of the digital signature. In one implementation, the digital document also specifies a signature region in which the signature is graphically presented. The signature region has a location and a fixed or a variable size. If the digital document specifies a fixed document layout, the signature region can have a location defined in the layout. Alternatively, the signature region can have a location relative to a signed content portion in the document.

The system presents the received document or a portion of the document in a user interface (step 420). For example, the system can graphically represent the received document in a pixel array that corresponds to a document layer in a graphical user interface. The document layer can be composited with one or more application layers to present the document.

The system determines a current status for the digital signature (step 430). The system can analyze the digital signature to determine the identity of the signer or to authenticate the signed content, and determine the current status based on the result of the analysis. Without performing the analysis or if the analysis fails, the system can specify a "Don't know" status for the signature.

The system associates a representation of the current status with the digital signature (step 440). The current status representation is a human perceivable representation that can include text, one or more icons or other images, video or audio to identify the current status.

In a user interface, the system presents the current status representation in visual association with the unaltered graphical representation of the digital signature (step 450). That is, the current status representation is presented without altering the graphical representation of the digital signature in the received document. If the document is presented in a document layer of the user interface, the system can rasterize the current status representation in an application layer that is overlaid and composited with the document layer to define an output layer that is presented to a user. In the output layer, the current status representation can be located in the vicinity or over the graphical representation of the digital signature to establish a visual association between the status representation and the signature.

Automatically or in response to user input, the system determines whether the status of the signature should be updated (decision 460). For example, the system can automatically update the signature's status when the document changes. Or the user can request an update by selecting a corresponding menu item, the status representation or the graphical representation of the signature. The user can choose which method should be employed. If an update is required ("Yes" branch of decision 460), the system determines a new current status for the digital signature (that is, returns to step 430), associates a representation of the new status with the digital signature (step 440) and presents the representation of the new status instead of the old status of the digital signature (step 450). If no update is required ("No" branch of decision 460), the current status representation remains unchanged (that is, the system returns to step 450).

Figure 5:
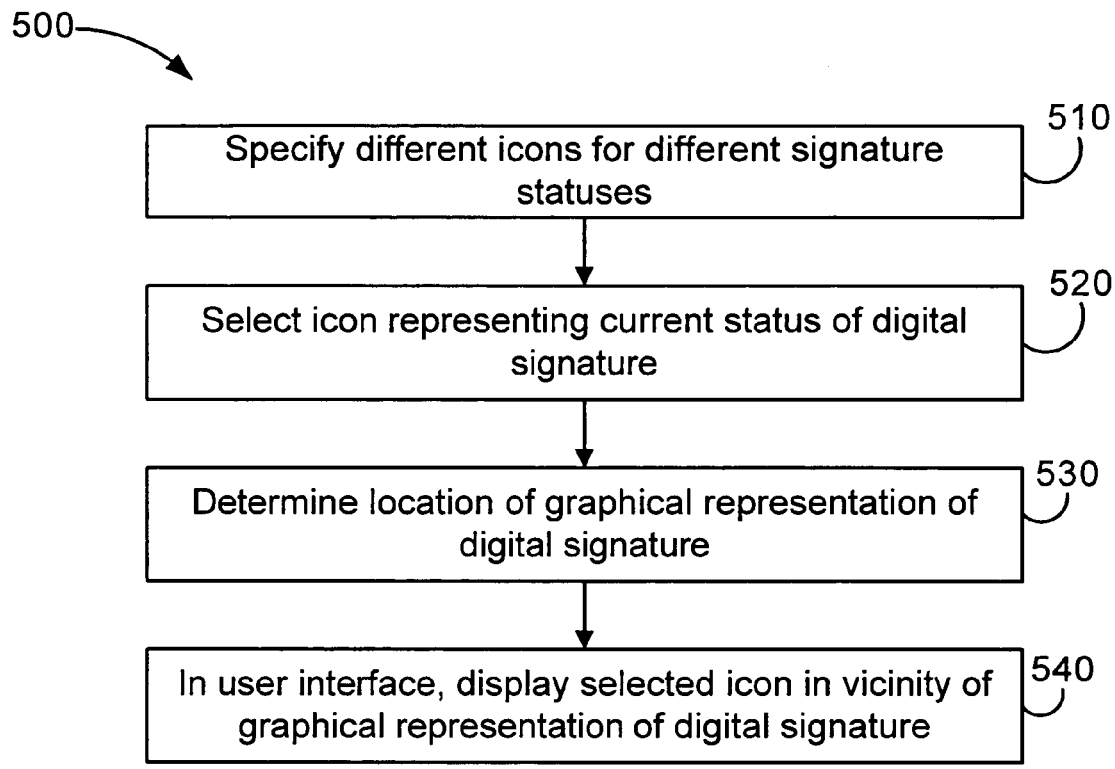

FIG. 5 illustrates a method 500 for visually associating a current status with a digital signature in a digital document. The method 500 can be performed by a system that includes the document management application 100 (FIG. 1).

The system specifies different icons for different signature statuses (step 510). Each icon is a small image that illustrates a symbol corresponding to the represented signature status. For example, an icon illustrating a green check mark can represent a valid signature, or an icon illustrating a red cross can represent an invalid signature. The system can also specify icons for identified or unidentified signers or other statuses of the digital signature.

From the specified icons, the system selects an icon that represents a current status of the digital signature (step 520).

The system determines the location of a graphical representation of the digital signature in the document (step 530). If the signature is represented in a signature region whose location is explicitly specified in the document, the system can retrieve the location of signature region. If the layout of the document is different in different interfaces, the system can identify the graphical representation of the signature, and determine its location in the particular layout.

In a user interface, the system displays the selected icon in the vicinity of the graphical representation of the digital signature (step 540). For example, the selected icon can be displayed over the graphical representation of the signature, or within or next to a signature region. Thus a human user can easily associate the icon indicating the current status with the corresponding signature. In one implementation, the icon indicating the current status is presented if the graphical representation of the digital signature is also presented. Alternatively, the icon can be presented only if the system receives user input selecting the graphical representation of the signature.

Figure 6:
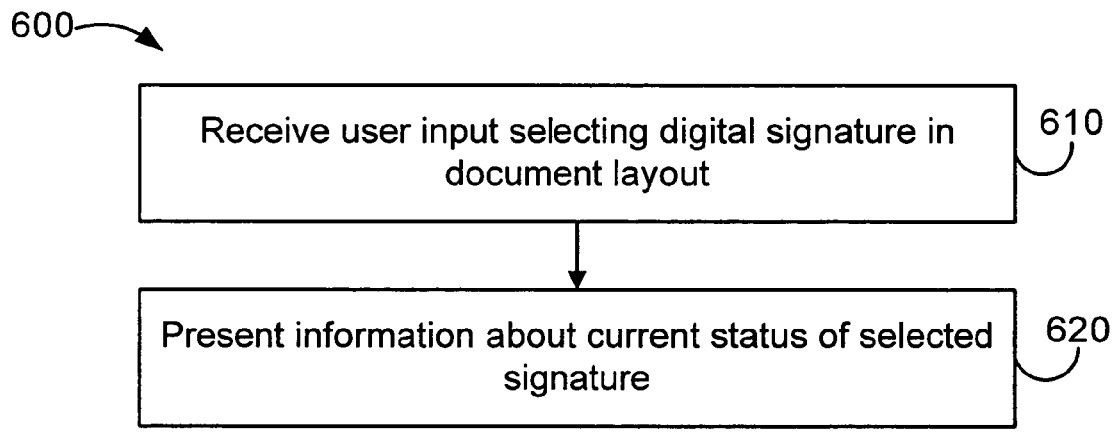

FIG. 6 illustrates a method 600 for presenting status information about a digital signature in response to user input. The digital signature has a graphical representation in a digital document. The digital document is presented in a graphical user interface in a particular document layout. The method 600 can be performed by a system that includes the document management application 100 (FIG. 1).

The system receives user input selecting the graphical representation of the signature in the document layout (step 610). If the signature is represented in a signature region, the system can receive user input from a pointing device that selects the signature region. If a status icon is associated with the signature and the icon is presented in the vicinity of the graphical representation of the signature, the pointing device can select the icon.

In response to the user input, the system presents information about a current status of the selected signature (step 620). For example, the system can present a dialog box including information about the current status of the signature. If the user input selects the icon indicating the status of the signature, the system can present an explanation of the status indicated by the selected icon. The information can be presented for a predetermined time period or as long as the user points to the signature. The current status of the signature can be updated each time the user selects the signature. For example, the current signature status can be updated as the system verifies the validity of the signature. Optionally, the system can present a menu from which the user can select one or more items to access particular information about the current status of the digital signature.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results. Although the documents, digital signatures, and status representations that have been discussed in detail had graphical representations, the invention can also be implemented to include video or audio representations.

What is claimed is:

1. A computer-implemented method for presenting status of digital signatures, the method comprising:
   receiving a digital document that defines a presentation structure and includes a digital signature, the digital document specifying a representation of the digital signature and a location in the presentation structure for the representation of the digital signature;
   determining a status for the digital signature;
   associating a status representation with the digital signature, the status representation identifying the status determined for the digital signature;
   without altering the representation of the digital signature, presenting at least a portion of the digital document and the status representation of the digital signature in a user interface, the status representation being presented in the presentation structure at a location that depends upon the location in the presentation structure for the representation of the digital signature; and
   wherein the representation of the digital signature includes a graphical representation of the digital signature.

2. The method of claim 1, wherein:
   determining a status for the digital signature includes selecting a status from a plurality of predefined statuses.

3. The method of claim 2, wherein each predefined status is represented by a corresponding icon, and the status representation of the digital signature includes the icon representing the selected status.

4. The method of claim 2, wherein one or more of the predefined statuses indicate that the digital signature is a valid signature or an invalid signature.

5. The method of claim 4, wherein determining a status for the digital signature includes:
   determining whether the received document is changed since it has been signed; and
   selecting a status that indicates an invalid signature if the received document is changed since it has been signed.

6. The method of claim 2, wherein one or more of the predefined statuses indicate that the signer of the digital signature is identified or unknown.

7. The method of claim 2, wherein one or more of the predefined statuses indicate that the validity of the digital signature has not been determined.

8. The method of claim 2, wherein one or more of the predefined statuses indicate a confidence level for the validity of the digital signature.

9. The method of claim 1, wherein:
   presenting the status representation of the digital signature includes presenting the status representation in response to user input.

10. The method of claim 1, wherein the graphical representation of the digital signature is specified in a signature region defined in the presentation structure.

11. The method of claim 10, wherein the status representation defines a graphical status representation, and wherein:
    presenting the status representation of the digital signature includes presenting the graphical status representation at a location within the signature region.

12. The method of claim 1, further comprising:
    receiving a user input selecting the representation of the digital signature in the user interface; and in response to the received user input, presenting information in the user interface about the status determined for the digital signature.

13. The method of claim 12, wherein:
receiving a user input includes receiving a user input from a pointing device.

14. The method of claim 12, wherein:
receiving a user input selecting the digital signature includes receiving a user input selecting the status representation presented in the user interface.

15. The method of claim 1, further comprising:
updating the status for the digital signature; and
based upon the updated status, updating the status representation of the digital signature.

16. The method of claim 1, wherein the digital document includes a second digital signature and specifies a representation for the second digital signature and a location in the presentation structure for the representation of the second digital signature, the method further comprising:
determining a status for the second digital signature;
associating a second status representation with the second digital signature, the second status representation identifying the status determined for the second digital signature; and
without altering the representation of the second digital signature, presenting the second status representation in the presentation structure at a location that depends upon the location in the presentation structure for the representation of the second signature.

17. The method of claim 1, wherein the presentation structure defines a layout of the document, and wherein the location of the representation of the digital signature is defined in the layout of the document.

18. A software product, tangibly embodied in a machine-readable medium, for presenting status of digital signatures, the software product comprising instructions operable to cause one or more data processing apparatus to perform operations comprising:
receiving a digital document that defines a presentation structure and includes a digital signature, the digital document specifying a representation of the digital signature and a location in the presentation structure for the representation of the digital signature;
determining a status for the digital signature;
associating a status representation with the digital signature, the status representation identifying the status determined for the digital signature;
without altering the representation of the digital signature, presenting at least a portion of the digital document and the status representation of the digital signature in a user interface, the status representation being presented in the presentation structure at a location that depends upon the location in the presentation structure for the representation of the digital signature; and
wherein the representation of the digital signature includes a graphical representation of the digital signature.

19. The software product of claim 18, wherein:
determining a status for the digital signature includes selecting a status from a plurality of predefined statuses.

20. The software product of claim 19, wherein each predefined status is represented by a corresponding icon, and the status representation of the digital signature includes the icon representing the selected status.

21. The software product of claim 19, wherein one or more of the predefined statuses indicate that the digital signature is a valid signature or an invalid signature.

22. The software product of claim 21, wherein determining a status for the digital signature includes:
determining whether the received document is changed since it has been signed; and
selecting a status that indicates an invalid signature if the received document is changed since it has been signed.

23. The software product of claim 19, wherein one or more of the predefined statuses indicate that the signer of the digital signature is identified or unknown.

24. The software product of claim 19, wherein one or more of the predefined statuses indicate that the validity of the digital signature has not been determined.

25. The software product of claim 19, wherein one or more of the predefined statuses indicate a confidence level for the validity of the digital signature.

26. The software product of claim 18, wherein:
presenting the status representation of the digital signature includes presenting the status representation in response to user input.

27. The software product of claim 18, wherein the graphical representation of the digital signature is specified in a signature region defined in the presentation structure.

28. The software product of claim 27, wherein the status representation defines a graphical status representation, and wherein:
presenting the status representation of the digital signature includes presenting the graphical status representation at a location within the signature region.

29. The software product of claim 18, further comprising instructions operable to cause one or more data processing apparatus to perform operations comprising:
receiving a user input selecting the representation of the digital signature in the user interface; and
in response to the received user input, presenting information in the user interface about the status determined for the digital signature.

30. The software product of claim 29, wherein:
receiving a user input includes receiving a user input from a pointing device.

31. The software product of claim 29, wherein:
receiving a user input selecting the digital signature includes receiving a user input selecting the status representation presented in the user interface.

32. The software product of claim 18, further comprising instructions operable to cause one or more data processing apparatus to perform operations comprising:
updating the status for the digital signature; and
based upon the updated status, updating the status representation of the digital signature.

33. The software product of claim 18, wherein the digital document includes a second digital signature and specifies a representation for the second digital signature and a location in the presentation structure for the representation of the second digital signature, the software product further comprising instructions operable to cause one or more data processing apparatus to perform operations comprising:
determining a status for the second digital signature;
associating a second status representation with the second digital signature, the second status representation identifying the status determined for the second digital signature; and
without altering the representation of the second digital signature, presenting the second status representation in the presentation structure at a location that depends upon the location in the presentation structure for the representation of the second signature.

34. The software product of claim 18, wherein the presentation structure defines a layout of the document, and wherein the location of the representation of the digital signature is defined in the layout of the document.

35. A system comprising:
an output device; and
a computer programmed to perform operations comprising:
receiving a digital document that defines a presentation structure and includes a digital signature, the digital document specifying a representation of the digital signature and a location in the presentation structure for the representation of the digital signature;
determining a status for the digital signature;
associating a status representation with the digital signature, the status representation identifying the status determined for the digital signature;
without altering the representation of the digital signature, presenting at least a portion of the digital document and the status representation of the digital signature in a user interface, the status representation being presented in the presentation structure at a location that depends upon the location in the presentation structure for the representation of the digital signature; and
wherein the representation of the digital signature includes a graphical representation of the digital signature.

36. The system of claim 35, wherein:
determining a status for the digital signature includes selecting a status from a plurality of predefined statuses.

37. The system of claim 36, wherein each predefined status is represented by a corresponding icon, and the status representation of the digital signature includes the icon representing the selected status.

38. The system of claim 36, wherein one or more of the predefined statuses indicate that the digital signature is a valid signature or an invalid signature.

39. The system of claim 38, wherein determining a status for the digital signature includes:
determining whether the received document is changed since it has been signed; and
selecting a status that indicates an invalid signature if the received document is changed since it has been signed.

40. The system of claim 36, wherein one or more of the predefined statuses indicate that the signer of the digital signature is identified or unknown.

41. The system of claim 36, wherein one or more of the predefined statuses indicate that the validity of the digital signature has not been determined.

42. The system of claim 36, wherein one or more of the predefined statuses indicate a confidence level for the validity of the digital signature.

43. The system of claim 35, wherein:
presenting the status representation of the digital signature includes presenting the status representation in response to user input.

44. The system of claim 35, wherein the graphical representation of the digital signature is specified in a signature region defined in the presentation structure.

45. The system of claim 44, wherein the status representation defines a graphical status representation, and wherein:
presenting the status representation of the digital signature includes presenting the graphical status representation at a location within the signature region.

46. The system of claim 35, the operations further comprising:
receiving a user input selecting the representation of the digital signature in the user interface; and
in response to the received user input, presenting information in the user interface about the status determined for the digital signature.

47. The system of claim 46, wherein:
receiving a user input includes receiving a user input from a pointing device.

48. The system of claim 46, wherein:
receiving a user input selecting the digital signature includes receiving a user input selecting the status representation presented in the user interface.

49. The system of claim 35, the operations further comprising:
updating the status for the digital signature; and
based upon the updated status, updating the status representation of the digital signature.

50. The system of claim 35, wherein the digital document includes a second digital signature and specifies a representation for the second digital signature and a location in the presentation structure for the representation of the second digital signature, the operations further comprising:
determining a status for the second digital signature;
associating a second status representation with the second digital signature, the second status representation identifying the status determined for the second digital signature; and
without altering the representation of the second digital signature, presenting the second status representation in the presentation structure at a location that depends upon the location in the presentation structure for the representation of the second signature.

51. The system of claim 35, wherein the presentation structure defines a layout of the document, and wherein the location of the representation of the digital signature is defined in the layout of the document.

* * * * *